US012800746B2

(12) United States Patent
Meng et al.

(10) Patent No.: US 12,800,746 B2
(45) Date of Patent: Nov. 17, 2026

(54) OBJECT DETECTION USING RADAR AND LIDAR FUSION

(71) Applicant: Motional AD LLC, Boston, MA (US)

(72) Inventors: Xiaoli Meng, Singapore (SG); Lubing Zhou, Singapore (SG); Karan Rajendra Shetti, Singapore (SG)

(73) Assignee: Motional AD LLC, Boston, MA (US)

( * ) Notice: Subject to any disclaimer, the term of this patent is extended or adjusted under 35 U.S.C. 154(b) by 161 days.

(21) Appl. No.: 18/788,679

(22) Filed: Jul. 30, 2024

(65) Prior Publication Data

US 2024/0393451 A1 Nov. 28, 2024

Related U.S. Application Data

(63) Continuation of application No. 17/496,495, filed on Oct. 7, 2021, now Pat. No. 12,117,519.

(51) Int. Cl.
*G01S 13/86* (2006.01)
*G01S 7/41* (2006.01)
(Continued)

(52) U.S. Cl.
CPC ............ *G01S 13/865* (2013.01); *G01S 7/412* (2013.01); *G01S 7/417* (2013.01); *G01S 13/42* (2013.01); *G06F 18/23* (2023.01); *G06F 18/253* (2023.01); *G06N 20/00* (2019.01); *G06T 7/162* (2017.01); *G06V 20/56* (2022.01); *G06T 2207/10028* (2013.01); *G06T 2207/20081* (2013.01);
(Continued)

(58) Field of Classification Search
CPC ........ G01S 17/931; G01S 17/89; G01S 17/86; G01S 17/865; G01S 17/894; G01S 13/931; G01S 13/89; G01S 13/825; G01S 7/417; G01S 7/4802; G01S 7/4808; G06T 7/162; G06T 7/10; G06T 2207/10028; G06T 2207/20084; G06V 20/58; G06V 20/56; G06V 20/70; G06V 10/82; G06V 10/764; G06V 10/25; G06V 10/7715; G06V 10/80144
USPC ............................ 342/54; 382/103; 356/4.01
See application file for complete search history.

(56) References Cited

U.S. PATENT DOCUMENTS 8,589,119 B2 * 11/2013 Comi ................ G06F 16/90335 702/188
9,296,393 B2 * 3/2016 Oh ........................ G01S 17/931
(Continued)

FOREIGN PATENT DOCUMENTS

CN 113139607 7/2021
CN 113158763 A 7/2021

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
(Continued)

*Primary Examiner* — Michael W Justice
(74) *Attorney, Agent, or Firm* — Fish & Richardson P.C.

(57) ABSTRACT

Provided are methods for object detection using radar and lidar fusion, which can include generating clusters combining clusters of point clouds for radar and lidar, respectively, from which fused features are determined using a deep learning model. Systems and computer program products are also provided.

19 Claims, 12 Drawing Sheets

(51) Int. Cl.
*G01S 13/42* (2006.01)
*G06F 18/23* (2023.01)
*G06F 18/25* (2023.01)
*G06N 20/00* (2019.01)
*G06T 7/162* (2017.01)
*G06V 20/56* (2022.01)

(52) U.S. Cl.
CPC ............... *G06T 2207/20084* (2013.01); *G06T 2207/30252* (2013.01)

(56) References Cited

U.S. PATENT DOCUMENTS

| | | | | |
|---|---|---|---|---|
| 10,534,079 | B2 * | 1/2020 | Kim | G01S 17/86 |
| 10,602,242 | B2 * | 3/2020 | Zeng | H04Q 9/00 |
| 10,670,708 | B2 * | 6/2020 | Kemmer | A01F 15/0825 |
| 11,055,540 | B2 * | 7/2021 | Tsoi | G06N 3/0464 |
| 11,170,215 | B1 * | 11/2021 | Sieracki | G06F 18/23 |
| 11,194,842 | B2 * | 12/2021 | Mota Toledo | G06F 16/287 |
| 11,397,242 | B1 * | 7/2022 | Zhang | G06V 10/806 |
| 11,605,228 | B2 * | 3/2023 | Wu | G06F 18/253 |
| 11,733,386 | B2 * | 8/2023 | Banerjee | G01S 13/42 342/54 |
| 11,734,883 | B2 * | 8/2023 | Eckman | G01C 21/383 345/424 |
| 2012/0197596 | A1 * | 8/2012 | Comi | G06F 16/90335 702/188 |
| 2015/0098076 | A1 * | 4/2015 | Oh | G01S 17/931 356/4.01 |
| 2017/0248693 | A1 * | 8/2017 | Kim | G01S 13/865 |
| 2018/0188366 | A1 * | 7/2018 | Kemmer | A01F 15/0825 |
| 2018/0348343 | A1 * | 12/2018 | Achour | G01S 7/415 |
| 2018/0367871 | A1 * | 12/2018 | Zeng | G01S 13/931 |
| 2019/0220471 | A1 * | 7/2019 | Mota Toledo | G06F 16/906 |
| 2019/0353791 | A1 * | 11/2019 | Vignard | G01S 13/931 |
| 2020/0301013 | A1 * | 9/2020 | Banerjee | G01S 13/42 |
| 2020/0410252 | A1 * | 12/2020 | Tsoi | G06F 18/23 |
| 2021/0012520 | A1 * | 1/2021 | Zhou | B64U 20/87 |
| 2021/0080558 | A1 * | 3/2021 | Gosala | G01S 13/931 |
| 2021/0241026 | A1 * | 8/2021 | Deng | G01S 13/42 |
| 2021/0278523 | A1 * | 9/2021 | Urtasun | G01S 13/58 |
| 2021/0327280 | A1 * | 10/2021 | Choi | G08G 1/163 |
| 2021/0406674 | A1 * | 12/2021 | Wu | G06F 18/253 |
| 2022/0108445 | A1 * | 4/2022 | Zhang | G06T 7/0012 |
| 2022/0178718 | A1 * | 6/2022 | Xia | B60W 60/00256 |
| 2022/0182498 | A1 * | 6/2022 | Singh | G08G 1/16 |
| 2022/0214444 | A1 * | 7/2022 | Das | G01S 17/50 |
| 2022/0317302 | A1 * | 10/2022 | Slobodyanyuk | G01S 13/89 |
| 2022/0357441 | A1 * | 11/2022 | Ansari | G01S 13/867 |
| 2023/0005237 | A1 * | 1/2023 | Kamimura | G06V 10/82 |
| 2023/0109909 | A1 | 4/2023 | Meng et al. | |
| 2023/0111810 | A1 * | 4/2023 | Kim | H04W 4/027 455/519 |
| 2023/0141017 | A1 | 5/2023 | Kim et al. | |
| 2023/0244244 | A1 * | 8/2023 | Hanyuda | G05D 1/0274 701/25 |

OTHER PUBLICATIONS

Che et al., "Object Recognition, Segmentation, and Classification of Mobile Laser Scanning Point Clouds: A State of the Art Review," Sensors, Feb. 2019, 19(4):1-42.

Qian et al., "Robust Multimodal Vehicle Detection in Foggy Weather Using Complementary Lidar and Radar Signals," 2021 IEEE/CVF Conference on Computer Vision and Pattern Recognition (CVPR), Jun. 2021, pp. 444-453.

Wang et al., "High Dimensional Frustum PointNet for 3D Object Detection from Camera, LiDAR, and Radar," 2020 IEEE Intelligent Vehicles Symposium (IV), Oct. 2020, pp. 1621-1628.

Yang et al., "RadarNet: Exploiting Radar for Robust Perception of Dynamic Objects", submitted on Jul. 28, 2020, arXiv:2007.14366, 16 pages.

* cited by examiner

OBJECT DETECTION USING RADAR AND LIDAR FUSION

CROSS-REFERENCE TO RELATED APPLICATION

This application is a continuation of, and claims priority to U.S. patent application Ser. No. 17/496,495, filed Oct. 7, 2021 (now allowed). The entire contents of the previous application are incorporated by reference herein.

BACKGROUND

Light Detection and Ranging (LiDAR) determines information from light emitted by an emitter, reflected by an object, and detected by a detector. Similarly, Radio Detection and Ranging (RADAR) determines object information from radio waves emitted by an emitter, and reflected by an object. The information includes data associated with the object, such as a range to the object, velocity of the object, and the like. The detector is a photodetector that receives the light reflected by the object. The detector can be a solid state photodetector, a photomultiplier, or any combinations thereof.

BRIEF DESCRIPTION OF THE FIGURES

FIGS. 6A-1 and 6A-2 are diagrams collectively showing a RADAR and LiDAR fusion network for object detection;

DETAILED DESCRIPTION

Figure 1:
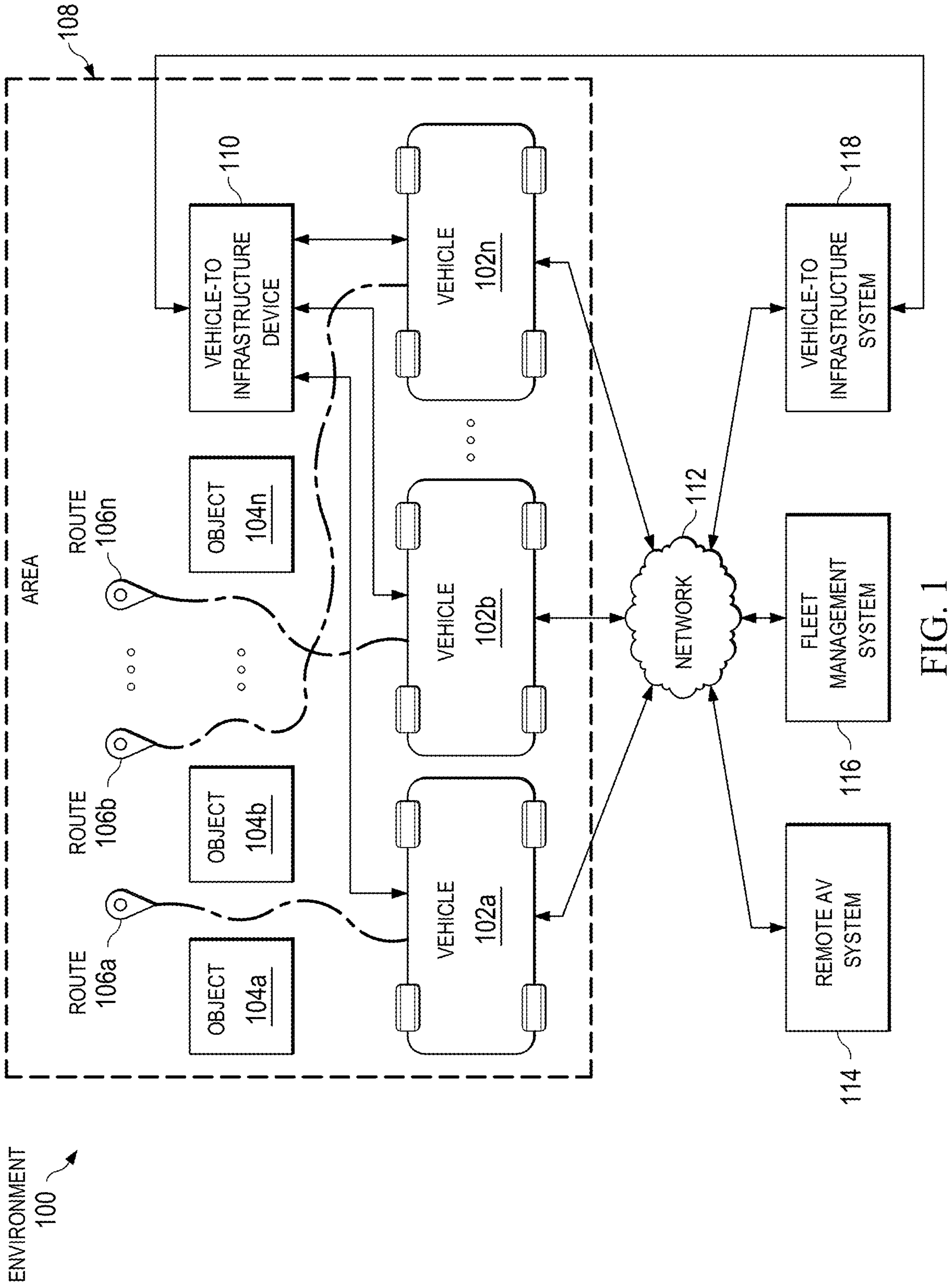
FIG. 1 is an example environment in which a vehicle including one or more components of an autonomous system can be implemented.

In the following description, numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a system for object detection using radar and lidar fusion. In some embodiments, Radio Detection and Ranging (RADAR or radar) detections are fused into a geometry framework for Light Detection and Ranging (LiDAR or lidar) object detections to leverage complementary information provided by the radar detections (e.g., reliable long range detections, precise radial velocity output). Clusters are generated for lidar and radar points, and features are extracted from the clusters individually and fused together using a learning network. In an embodiment, if a cluster from radar or lidar has no association, a point with default values is added to a lidar or radar branch of the learning network, without changing the architecture of the learning network, such that proposals from both lidar and radar sensors are used to improve recall. Precision and recall are commonly-used metrics for a detection/recognition pattern recognition system. Recall is the successful detection rate of all ground truth objects (Recall=1−missing detection rate), for example, using an equation: Recall=true positives/(true positives+false negatives). Precision is the percentage of correct detections of all detections, for example, using an equation: Precision=true positives/(true positives+false positives). In an example, recall refers to a prediction rate, such as a 60% prediction rate corresponding to detecting 60 real objects out of 100 real objects that exist. In an embodiment, association is done in a heuristic way. The centroids of the clusters, heading and speed of the objects are used to match lidar and radar clusters.

By virtue of the implementation of systems, methods, and computer program products described herein, techniques are described for object detection using radar and lidar fusion. For example, complementary radar and lidar data are fully exploited to improve object detection and velocity estimation. Radar is more robust to weather, and less sensitive to lighting conditions, and therefore provides a superior solution for night driving, but is not limited to night driving.

Implementation of systems, methods, and computer program products described herein can solve the problems of lidar measurements being too sparse, especially at long range, therefore leading to lidar-only-based methods having limited detection range and poor classification at far range. It is also challenging to use radar alone due to the noisy returns from clutter and multi-paths. Solutions disclosed herein include fusing radar into a framework of geometry-based lidar object detection. Fusing radar into a framework of geometry-based lidar object detection leverages complementary information from radar, including reliable detections up to a very long range (e.g., up to 200 meters) and precise radial velocity output.

For autonomous driving vehicles to drive safely on-road, it is desirable to increase the detection range of objects and improve classification accuracy. Moreover, accurately estimating the velocity of objects is also beneficial for an autonomous vehicle interacting with its environment. Fusing lidar and radar can provide an improved solution with enhanced detection range, higher accuracy in classification, and velocity estimation.

Lidar clusters generated using geometry-based methods and radar cluster proposals (e.g., candidate object clusters) can be combined. In this example, candidate clusters can include: 1) clusters that are later determined to be real clusters, and 2) clusters that are determined not to be clusters at all. For radar cluster proposals, the anchor boxes can be generated in different ways, for example, using pre-defined anchor boxes or learning from the size of lidar clusters. For example, an anchor box can be determined as two-dimensional (2D) fitted around the cloud of points in the lidar cluster (e.g., based on the radius of points). In some embodiments, once a radar cluster and lidar cluster are combined, each cluster can be extended using the dimensions of the paired cluster. For example, given an associated lidar cluster and radar cluster, radar points within 1.x (e.g., 1.2) times of the lidar cluster's radius can be added on top of existing points of the original radar cluster. The distance used for a lidar cluster's radius, for example, can be calculated from the cluster center to the farthest lidar point from the cluster center. The radar and radar clusters may not cover the full object dimension, but by combining the dimensions of both clusters, some missing points can be recovered from each cluster that were missed during their cluster segmentation phase. Association of lidar clusters and radar cluster proposals can be performed for lidar clusters to leverage radar data for longer detection range. The anchor box also has assigned to it an orientation (or an angle in degrees), for example, relative to horizontal or a line-of-sight of the vehicle. In an embodiment, radar proposals and lidar clusters can be associated by a rule-based method or through a learnable network. Once alignment (or association) between a lidar cluster and a radar cluster is done, a triple-head deep neural network can output cluster classification scores, a three-dimensional (3D) box prediction, and velocity estimation.

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited look-ahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
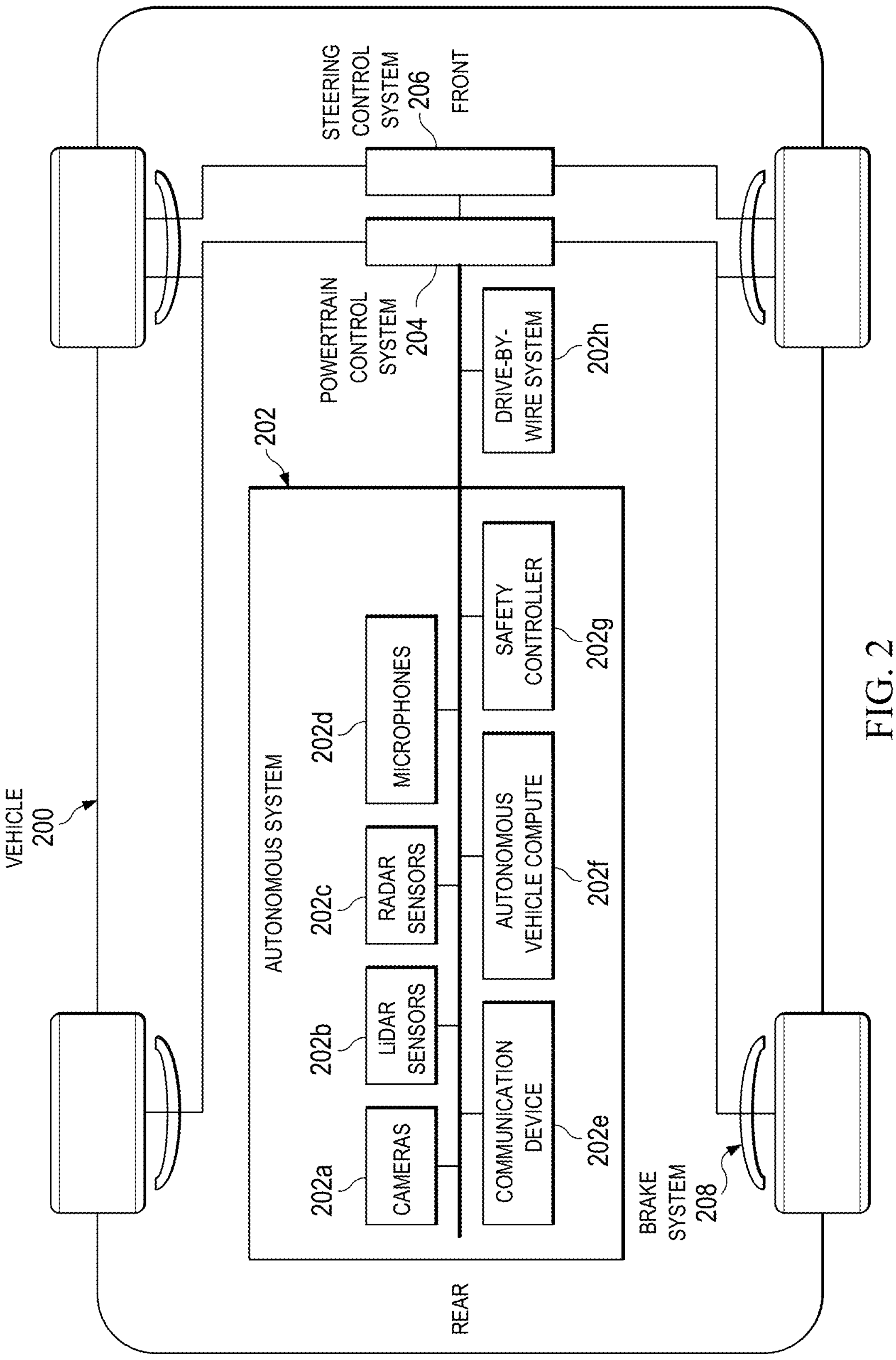
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras **202*a*, lidar sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, and drive-by-wire (DBW) system 202*h***.

Figure 3:
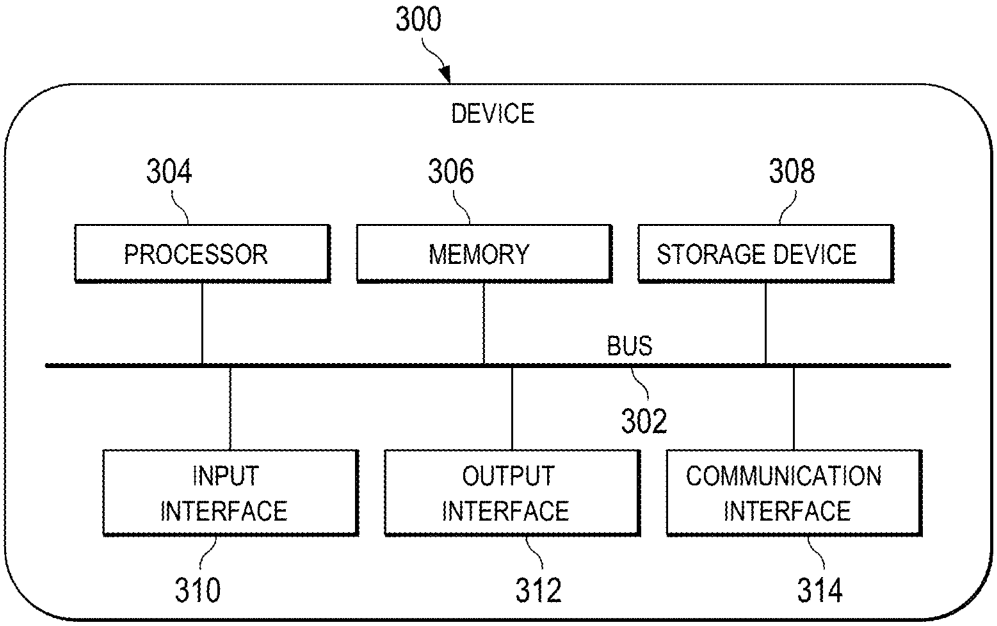
FIG. 3 is a diagram of components of one or more devices and/or one or more systems of FIGS. 1 and 2.

Cameras **202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a***.

In an embodiment, camera **202*a* includes at least one camera configured to capture one or more images associated with one or more traffic lights, street signs and/or other physical objects that provide visual navigation information. In some embodiments, camera 202*a* generates traffic light data (TLD) associated with one or more images. In some examples, camera 202*a* generates TLD data associated with one or more images that include a format (e.g., RAW, JPEG, PNG, and/or the like). In some embodiments, camera 202*a* that generates TLD data differs from other systems described herein incorporating cameras in that camera 202*a*** can include one or more cameras with a wide field of view (e.g., a wide-angle lens, a fish-eye lens, a lens having a viewing angle of approximately 120 degrees or more, and/or the like) to generate images about as many physical objects as possible.

Lidar sensors **202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by lidar sensors 202***b* include light (e.g., infrared light and/or the like) that is outside of the visible spectrum. In some embodiments, during operation, light emitted by lidar sensors 202*b* encounters a physical object (e.g., a vehicle) and is reflected back to lidar sensors 202*b*. In some embodiments, the light emitted by lidar sensors 202*b* does not penetrate the physical objects that the light encounters. Lidar sensors 202*b* also include at least one light detector which detects the light that was emitted from the light emitter after the light encounters a physical object. In some embodiments, at least one data processing system associated with lidar sensors 202*b* generates an image (e.g., a point cloud, a combined point cloud, and/or the like) representing the objects included in a field of view of lidar sensors 202*b*. In some examples, the at least one data processing system associated with lidar sensor 202*b* generates an image that represents the boundaries of a physical object, the surfaces (e.g., the topology of the surfaces) of the physical object, and/or the like. In such an example, the image is used to determine the boundaries of physical objects in the field of view of lidar sensors 202*b*.

Radar sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum. In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, lidar sensors 202*b*, radar sensors 202*c*, microphones 202*d*, autonomous vehicle compute 202*f*, safety controller 202*g*, and/or drive-by-wire (DBW) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, lidar sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, lidar sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
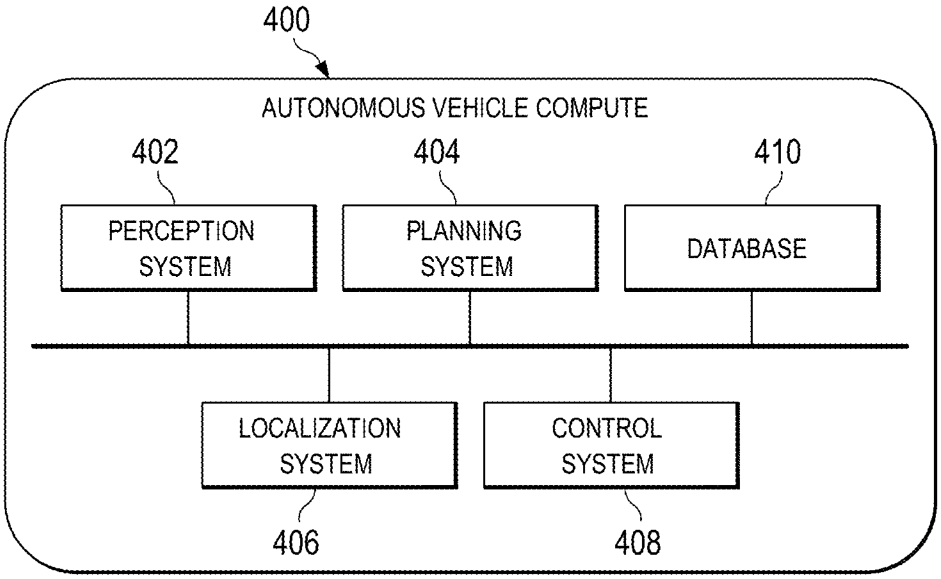
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives lidar data associated with at least one point cloud generated by at least one lidar sensor (e.g., lidar sensors 202*b*). In certain examples, localization system 406 receives data associated with at least one point cloud from multiple lidar sensors and localization system 406 generates a combined point cloud based on each of the point clouds. In these examples, localization system 406 compares the at least one point cloud or the combined point cloud to 2D and/or a 3D map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one auto-encoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one lidar sensor (e.g., a lidar sensor that is the same as or similar to lidar sensors 202*b*) to generate data associated with an image representing the objects included in a field of view of the at least one lidar sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
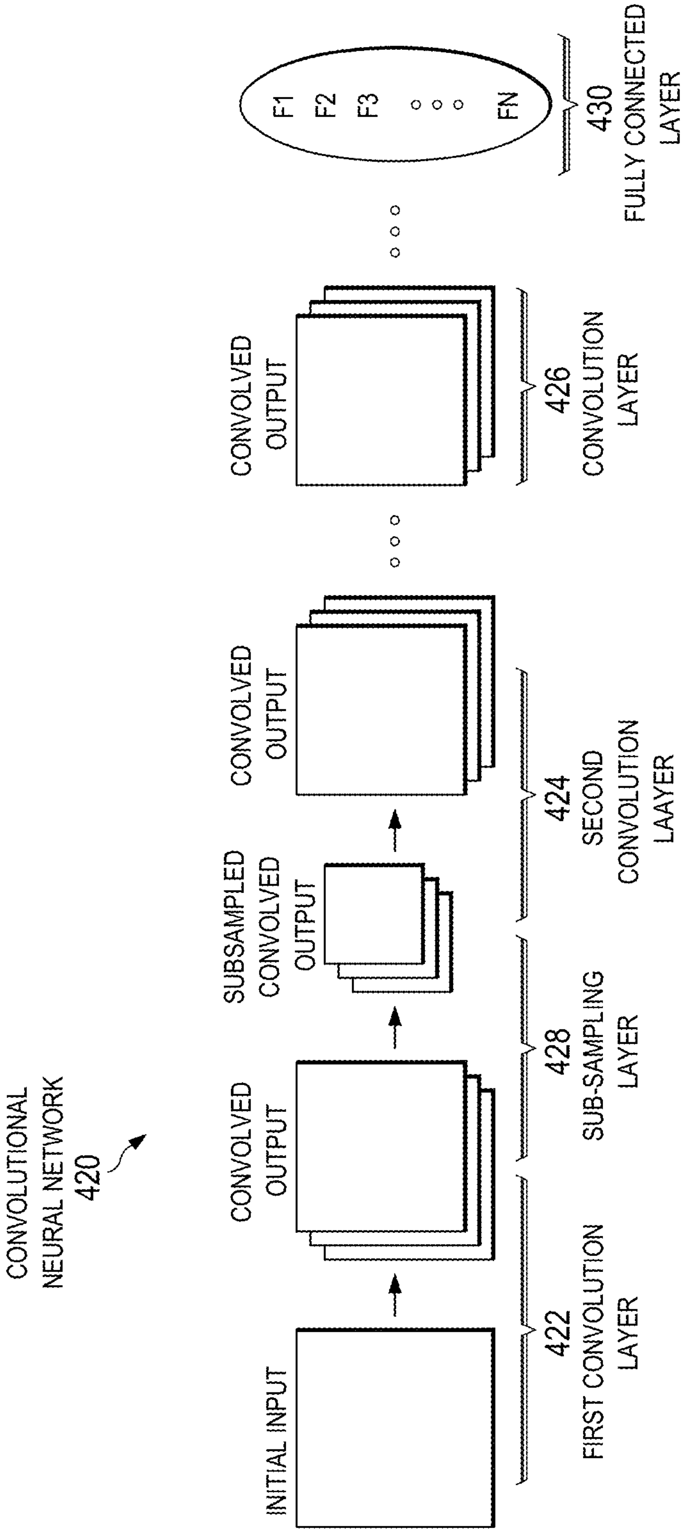
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, lidar data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
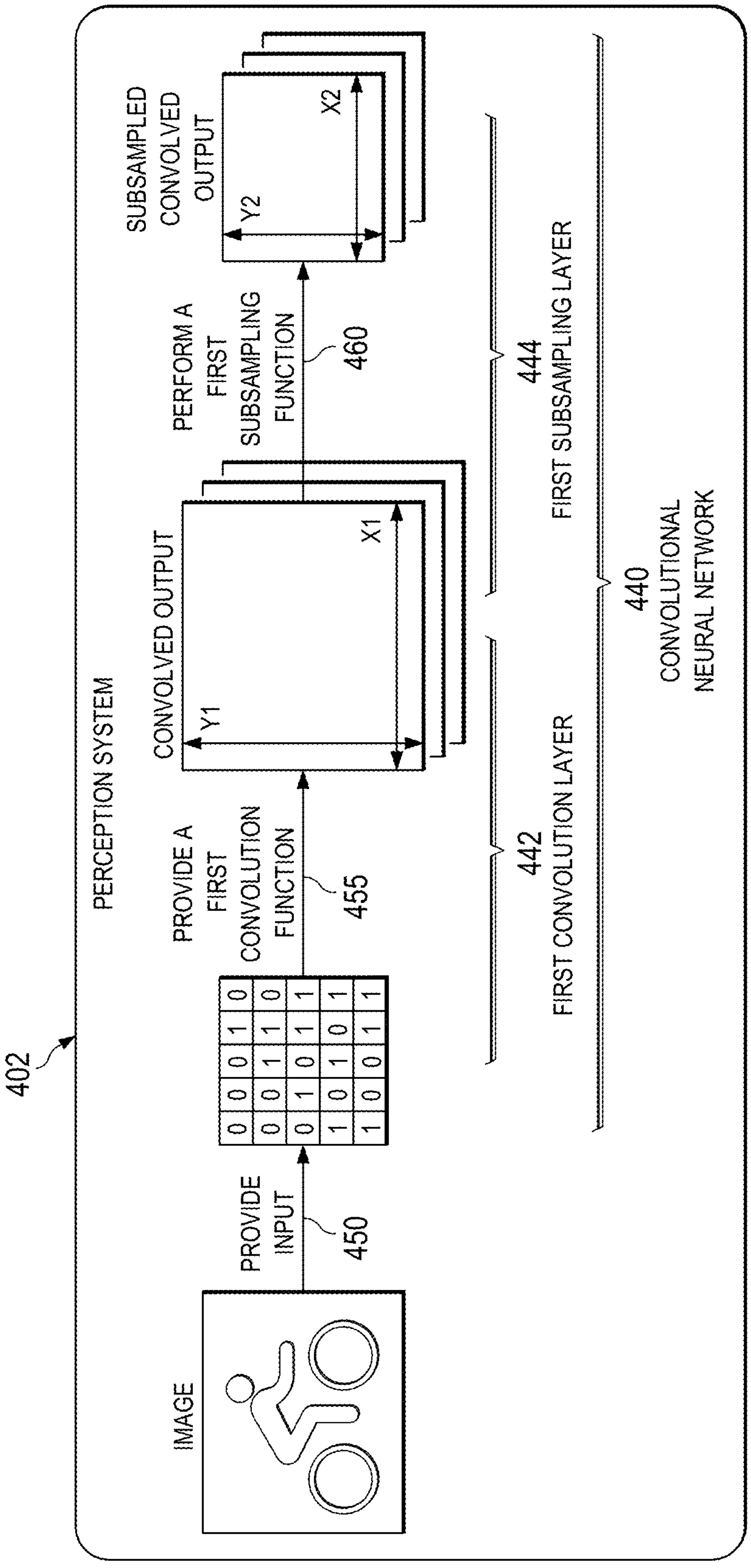
FIGS. 4C and 4D are a diagram illustrating example operation of a convolutional neural network (CNN)
Figure 4D:
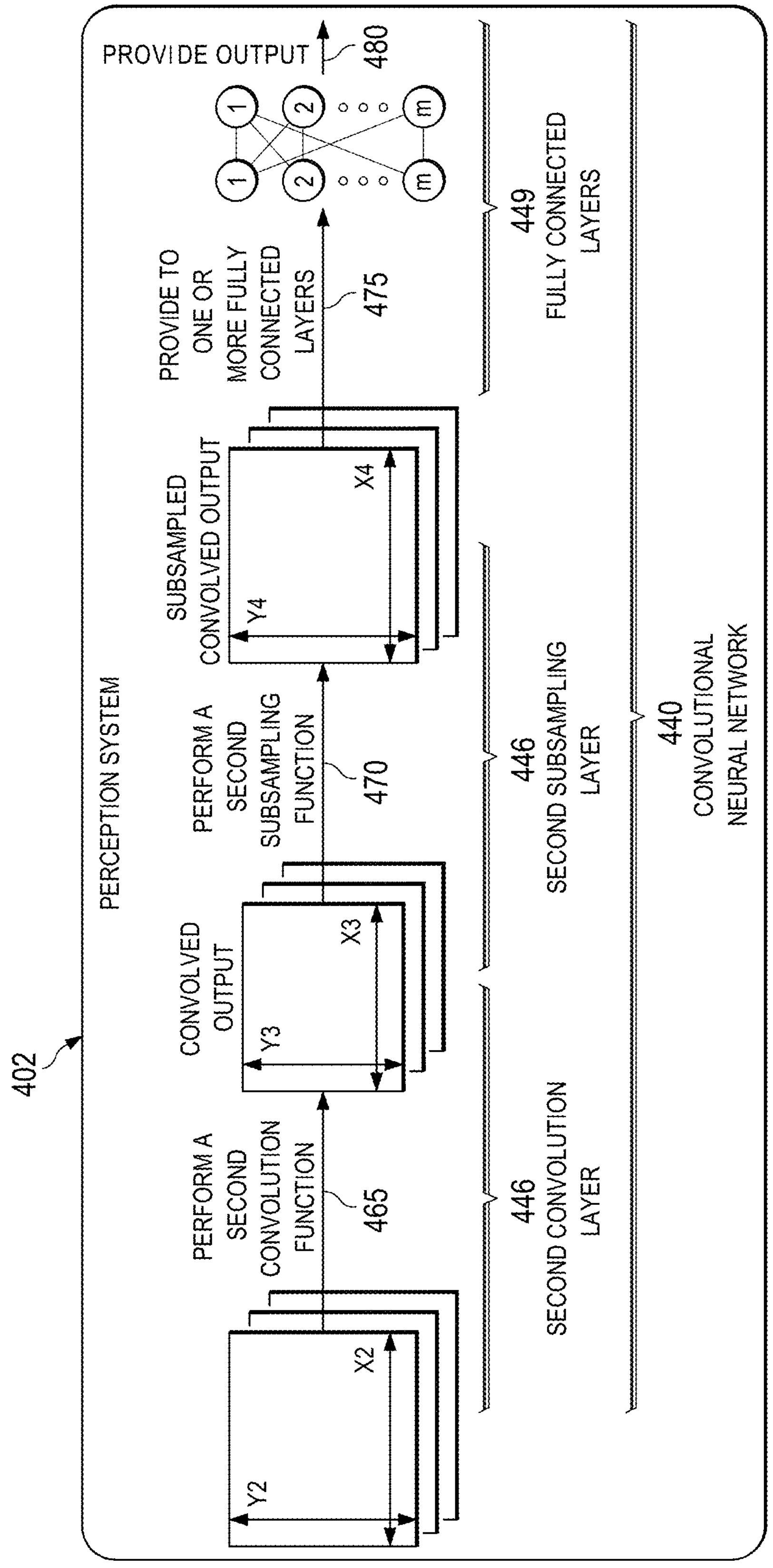

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a 2D array. In some embodiments, the data associated with the image may include data associated with a color image, the color image represented as values stored in a 3D array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
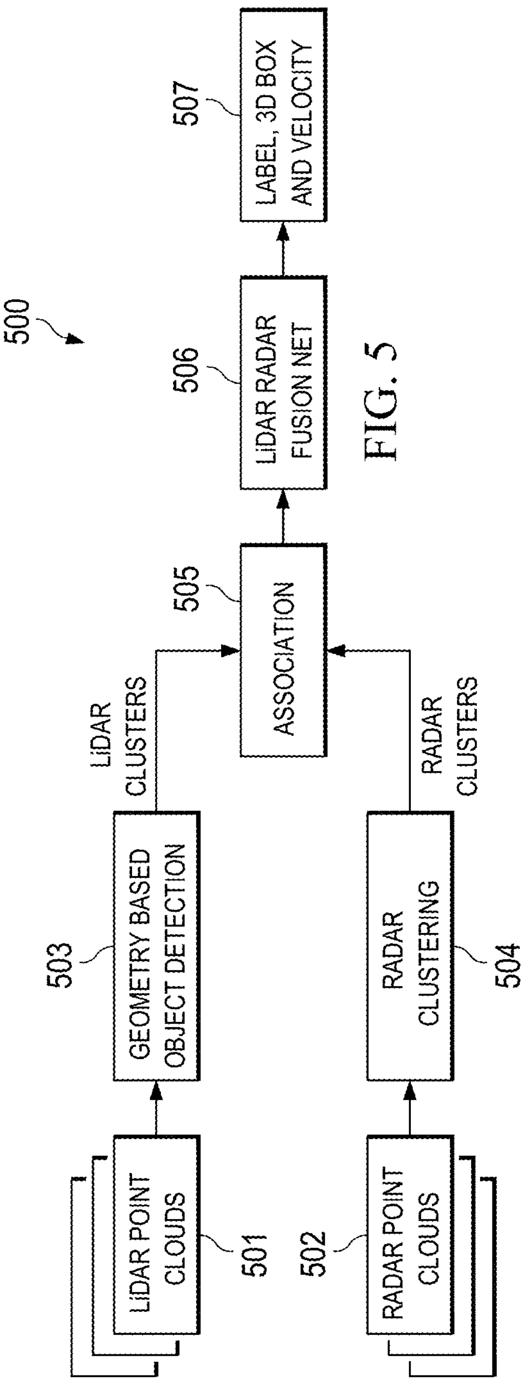
FIG. 5 is a diagram of an implementation of a process for object detection using Radio Detection and Ranging (RADAR) and Light Detection and Ranging (LiDAR) fusion.

Referring now to FIG. 5, illustrated is a diagram of an implementation 500 of a process for object detection using RADAR and LiDAR fusion. In some embodiments, implementation 500 includes multi-sweep of lidar point clouds 501 processed by lidar clustering 503 to generate lidar clusters. Multi-sweep of radar point clouds 502 is used in radar clustering 504. The lidar clusters and the radar clusters are matched by association 505 which is used to generate associated LiDAR and RADAR clusters. Then these LiDAR and RADAR clusters are used as the input of LiDAR RADAR Fusion Net 506 to predict object classification, 3D box and velocity 508. In association 505, LiDAR clusters and RADAR clusters are associated by classic data association algorithms such as the Hungarian algorithm, with the cluster-to-cluster cost (dissimilarity) being calculated from a weighted sum of center distance, heading angle difference, and velocity difference. The associated lidar and radar clusters are then fed to the LiDAR RADAR Fusion Net 506 to learn the fusion features from LiDAR and RADAR, and then are used to predict the object label, box and velocity 507. In cases when a paired LiDAR cluster or RADAR cluster is missing from the data association, i.e., and unmatched LiDAR or RADAR cluster, a dummy pair cluster with constant point values is used. With such handling, the Fusion Net is capable of dealing with all association results. The LiDAR RADAR Fusion Net 506 represents a LiDAR and RADAR fusion network, as described with reference to FIGS. 6A-1 and 6A-2, up to the last output layer (elements 610, 619, and 620). In some embodiments, system 500 is the same as or similar to system 402.

Figures 1, 6A:
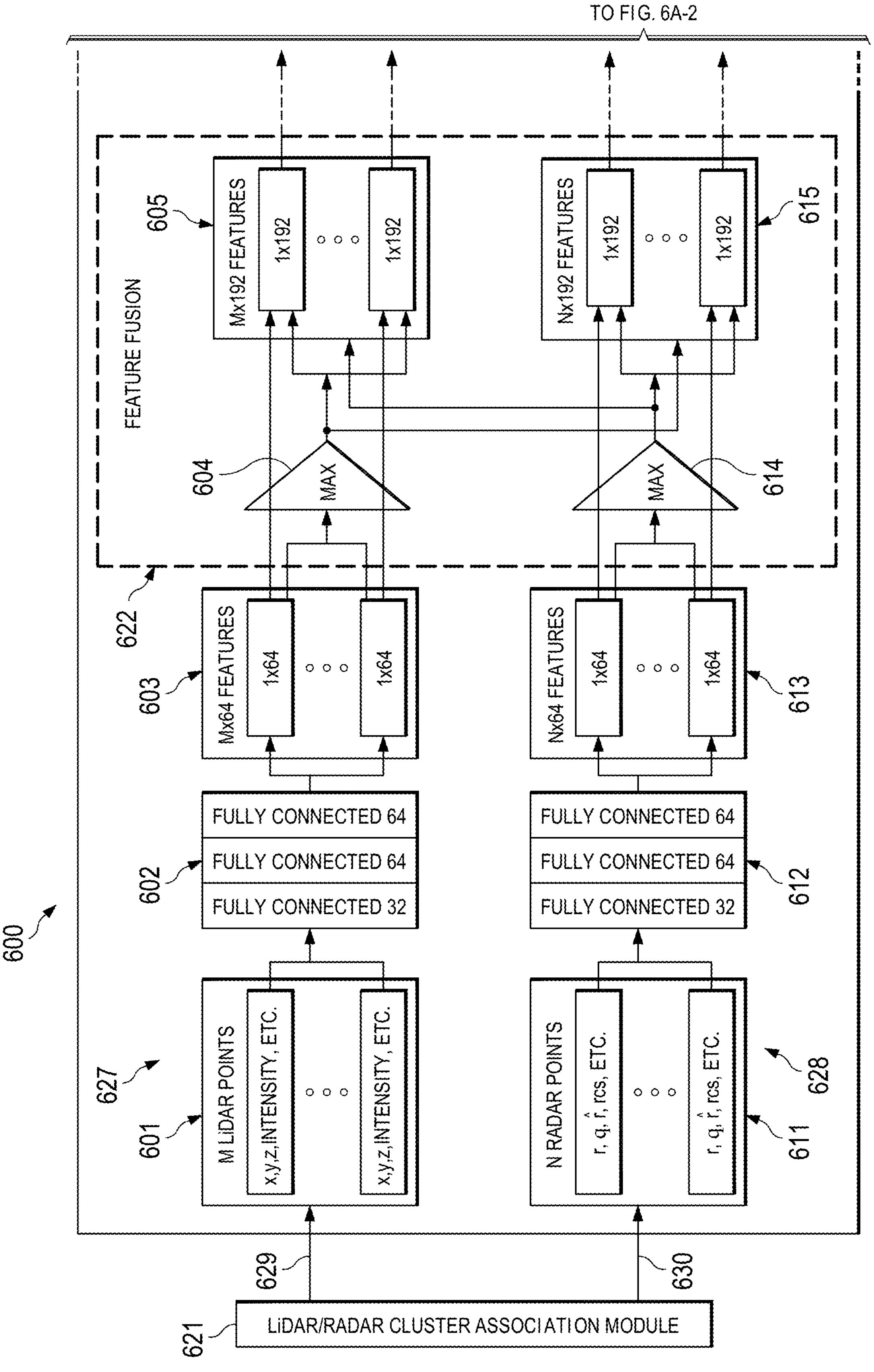
Figures 2, 6A:
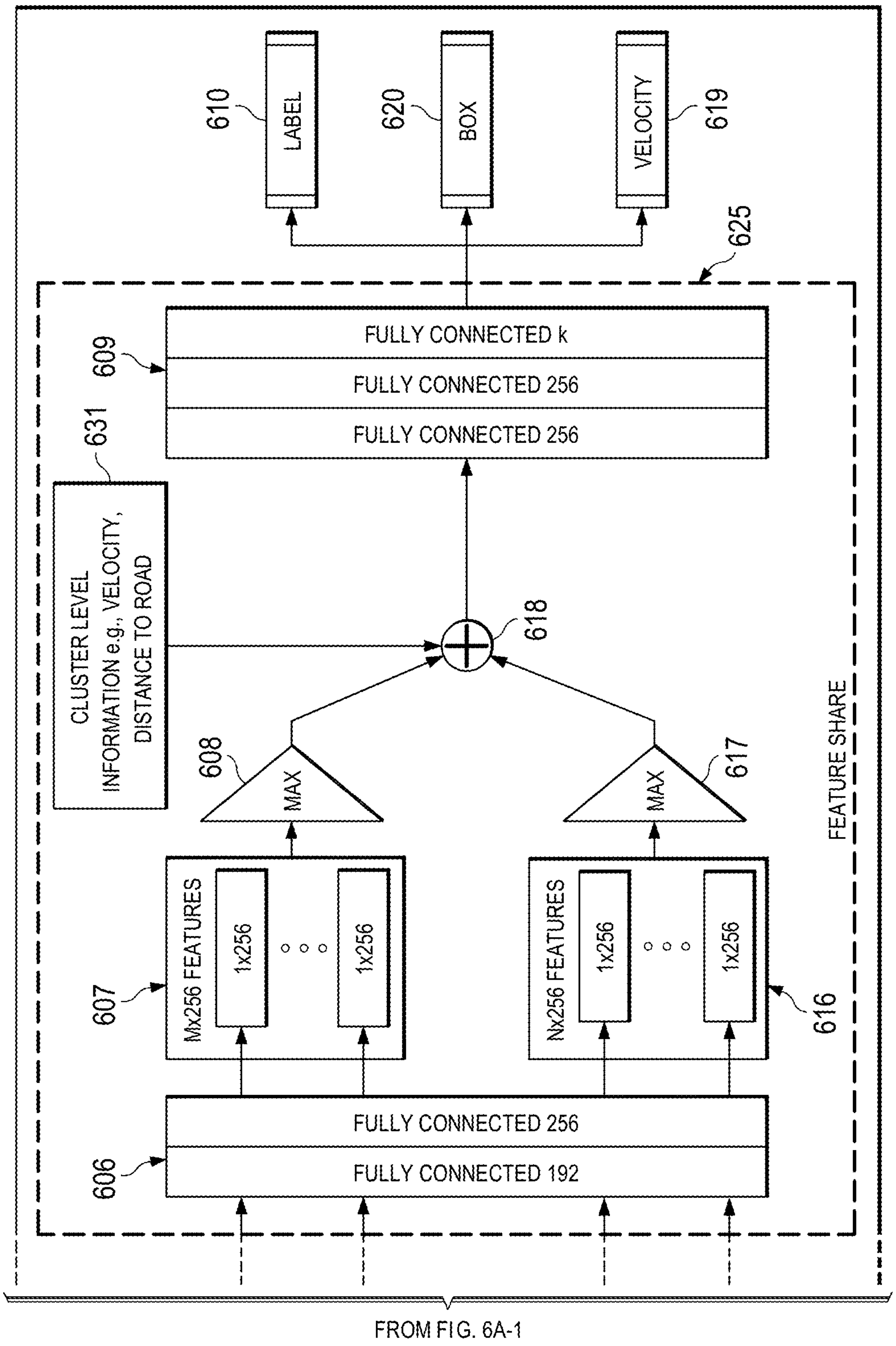

Referring now to FIGS. 6A-1 and 6A-2, illustrated is a diagram showing a RADAR and LiDAR fusion network for object detection. For example, FIGS. 6A-1 and 6A-2 collectively illustrate a deep learning network 600 for predicting labels, bounding boxes and velocity using fused radar and lidar data. The deep learning network 600 can be used to determine features from a lidar cluster and a radar cluster that are matched as a pair, for example, by a lidar/radar cluster association module 621. In some embodiments, lidar/radar cluster matching can be based on matching centroids of lidar and radar clusters. Creation of a matched lidar-and-radar cluster pair provides a lidar cluster input 629 to a lidar-associated pipeline 627, represented by a top portion of the deep learning network 600. Also, a radar cluster input 630 is provided to a radar-associated pipeline 628, represented by a bottom portion of the deep learning network 600. In situations in which a lidar cluster exists but a matched radar cluster does not exist, zero-padding or some other placeholder for the nonexistent radar cluster can be used throughout the deep learning network 600. Aspects of lidar/radar fusion that are absent from convention systems but are significant parts of the present disclosure are annotated by lidar/radar fusion elements 622 and 625, described later in more detail.

In a lidar cluster 601, each of M lidar data points includes, but is not limited to, its position in a reference frame (e.g., an x,y,z position in a Cartesian reference frame) and an intensity. For each point, the x,y,z and intensity are used. Note that x and y can be normalized by subtracting the cluster center x,y. This has a similar effect as POINTPILLAR, for example, which normalizes points' x,y by pillar center in a bird's eye view. In an embodiment, the clusters 601 are processed by three fully-connected layers 602 (specially 32, 64 and 64 output features for each layer) to create M by 64 features 603. However, any number of convolutional layers and features can be used. Block 604 (e.g., max pooling) is used to create M by 192 fused features 605 based on features 603 and 613. Raw points of a lidar cluster are fed to the lidar-associated pipeline 627 to learn lidar features first, and raw radar data is fed to the radar-associated pipeline 628 to learn radar features. The fusion occurs in the feature layers (604, 605, 614, and 615) of the network. In 604, for each lidar point with 64-d features, the 64-d lidar cluster global features after MAX pooling, and 64-d Radar cluster global features are concatenated as the new feature vector for each lidar point. Similarly, on top of each radar point's 64-d features, the 64-d lidar cluster global feature and 64-d radar cluster global features are concatenated as the new radar point feature.

In a radar cluster 611, each of N radar points includes radar information, including but not limited to: range, bearing, range rate, and amplitude. The clusters 611 are processed by three fully-connected layers 612 (specially 32, 64 and 64 output features for each layer) to create N by 64 features 613. However, any number of convolutional layers and features can be used. Block 614 (e.g., max pooling) is used to create N by 192 fused features 615 based on the features 613 and 603.

A lidar/radar fusion segment 622 of the deep learning network 600 provides an initial lidar/radar fusion point in the deep learning network 600 after features 603 and 613 are created. In the lidar/radar fusion segment 622, lidar data from the lidar-associated pipeline 627 is combined with radar data from the radar-associated pipeline 628. Also, radar data from the radar-associated pipeline 628 is combined with lidar data from the lidar-associated pipeline 627. The respective pipelines 627 and 628 are updated with the combined data. Combining of the data is represented by lines exiting blocks 604 and 614 (e.g., max pooling), providing inputs to the M by 192 fused features 605 and the N by 192 fused features 615 of the respective pipelines 627 and 628. This results in feature fusion in which the point network is customized to allow sharing, or fusion, of lidar/radar features exchanged and combined with the other type (e.g., radar or lidar). As an example, each of the N 64-d LiDAR features 613 are appended with the 64-d global RADAR features (after max pooling 604) and the 64-d global LiDAR features (max pooling 614), resulting in N 192-d LiDAR features 615. Likewise, the M 64-d RADAR features 603 will be appended to M 192-d RADAR features after the fusion. This combination produces the (lidar-and-radar-related) M by 192 fused features 605 and the (lidar-and-radar-related) N by 192 fused features 615. Here, 64 lidar features+64 radar features+64 global features=192 total features. The lidar and radar portions of the deep learning network 600 share a fully-connected network, specifically two fully-connected layers (192 and 256 output features, respectively) 606, generated from the M by 192 fused features 605 and the N by 192 fused features 615. The fully-connected layers 606 are used to generate M by 256 fused features 607 and N by 256 fused features 616 for lidar and radar, respectively.

At feature share 625, both the M by 256 fused features 607 and the N by 256 fused features 616 include lidar- and radar-detected features. Blocks 608 and 617 (e.g., max pooling blocks) are used to create fused cluster level information 618 (e.g., velocity, distance to road, etc.). The M by 256 fused features 607, the N by 256 fused features 616, and cluster level information 631 (e.g., including velocity and distance to road), are combined to fused cluster features in 618, and fed to the fully-connected layers (256 and k output features) 609. The output k features in the last fully-connected layer in 609 are used to generate labels 610, boxes 620, and velocities 619. The value of k in this case is the final dimension needed to produce the 610, 619, and 620 outputs. The 610, 619, and 620 outputs include the position, dimension, and label. A given label can identify that an object is, for example, a pedestrian. The label can further include a confidence score, for example, 80%, indicating that there is an 80% confidence that the object is a pedestrian. From 614 to 615, each radar point feature can be augmented with the radar cluster level feature (64-d after the Max Pooling layer) to encode radar cluster structure information. Furthermore, each lidar cluster level feature from 604 is also augmented to each radar point feature to encode lidar cluster based structure information. This fused 192-d feature will have the complementary information from lidar and radar, with both point-level and cluster-level information. In FIG. 6A-2, k is a varying dimension that depends on the number of object classes*dimension of (label+box+velocity), and k is configurable according to the application details.

In some embodiments, implementation 600 includes implementation 500. In some embodiments, system 600 is the same as or similar to system 202.

Figure 6B:
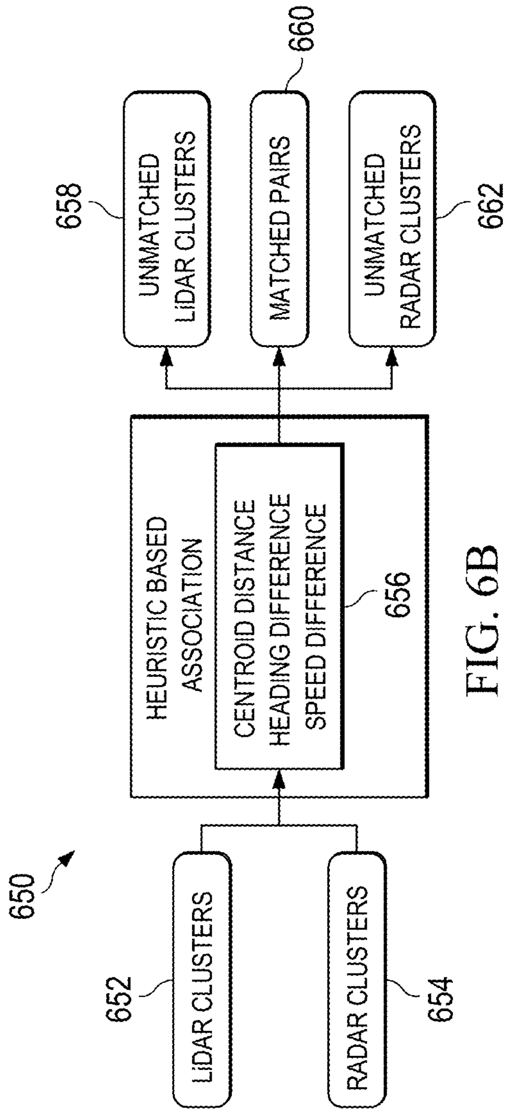
FIG. 6B is a block diagram showing an example workflow heuristic based association for LiDAR and RADAR clusters.

FIG. 6B is a block diagram showing an example workflow 650 for identifying objects using a heuristic based association. Given a list of the LiDAR clusters 652 and a list of RADAR clusters 654, a weighted score of centroid distance, heading difference and speed difference 656 can be used as the cost/dissimilarity for the data association. Any classic data association algorithms such as the Hungarian algorithm can be adopted for the association of the LiDAR clusters 652 and RADAR clusters 654. The result of the association includes unmatched lidar clusters 658, matched lidar/radar pairs 660, and unmatched radar clusters 662.

Figure 6C:
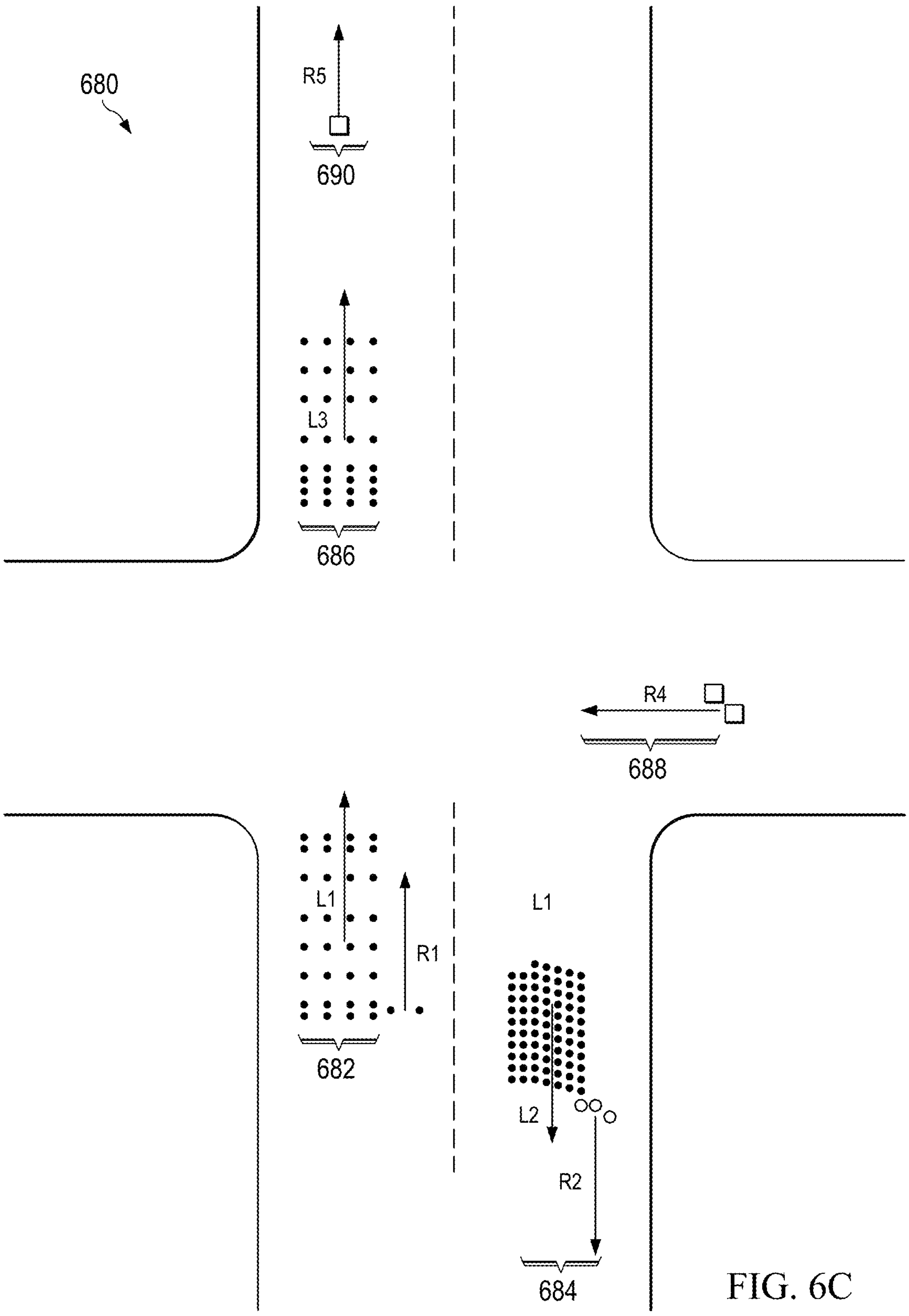
FIG. 6C is a diagram showing an example of association of LiDAR and RADAR clusters at a scene.

FIG. 6C is a diagram showing an example of association of LiDAR and RADAR clusters at a scene 680. The scene 680 includes five objects which can be identified using the workflow 650, for example. An L prefix representing objects detected by LiDAR, and an R prefix represents objects detected by RADAR. After association, <L1, R1> and <L2, R2> are two matched pairs 682 and 684, representing two objects. L3 is an unmatched LiDAR cluster representing an object 686. R4 and R5 are two unmatched RADAR clusters, representing two objects 688 and 690.

Figure 7:
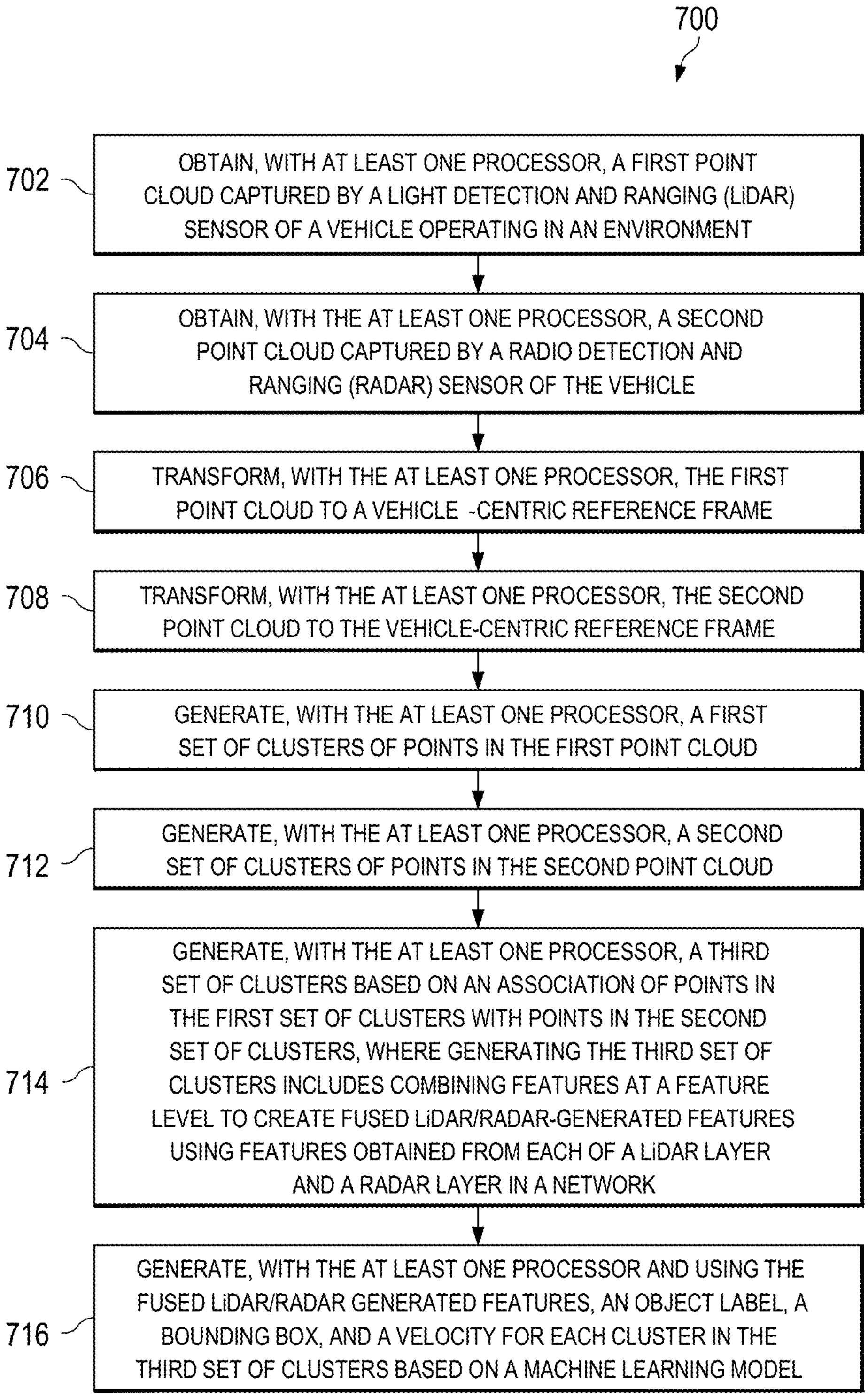
FIG. 7 is a flowchart of a process for object detection using RADAR and LiDAR fusion.

Referring now to FIG. 7, illustrated is a flowchart of a process 700 for object detection using RADAR and LiDAR fusion. In some embodiments, the object detection includes generating and labeling clusters that are generated based on an association of clusters from radar and clusters from lidar. In some embodiments, one or more of the steps described with respect to process 700 are performed (e.g., completely, partially, and/or the like) by perception system 402 (e.g., by one or more systems (or subsystems thereof) of perception system 402). Additionally, or alternatively, in some embodiments, one or more steps described with respect to process 700 are performed (e.g., completely, partially, and/or the like) by another device or group of devices separate from or including perception system 402, such as device 300. Blocks 710 and 712 are lidar and radar cluster segmentation pipelines. Classic point cloud segmentation methods can be used, such as GRAPHSEG or DBSCAN methods. Step 714 provides lidar and radar cluster association, where a data association algorithm such as the Hungarian algorithm can be used to associate the lidar and radar clusters using the centroid, speed, and heading angle. At 716, using capabilities not provided by conventional system, a lidar and radar fusion network is used to fuse the lidar cluster and radar cluster features to better predict the object label, bounding box, and velocity. The complementary lidar and radar features can enable improved far range detection performance.

At 702, a first point cloud captured by a lidar sensor (e.g., lidar sensor 202*b*) of a vehicle (e.g., AV 200) operating in an environment is obtained by at least one processor (e.g., processor 304). In some embodiments, the first point cloud is accumulated from multiple scans of the environment by the lidar sensor. In some embodiments, at least one data processing system associated with lidar sensors 202*b* generates depth data (e.g., the point cloud, a combined point cloud, and/or the like) representing the objects included in a scanning field of view of lidar sensors 202*b*. In some examples, at least one data processing system associated with lidar sensor 202*b* generates 3D data that represents the boundaries of a physical object, the surfaces (e.g., the topology of the surfaces) of the physical object, and/or the like. In such an example, the 3D data is used to determine the boundaries of physical objects in the field of view of lidar sensors 202*b*.

At 704, a second point cloud captured by a radar sensor (e.g., radar sensor 202*c*) of the vehicle (e.g., vehicle 200) is obtained with the at least one processor (e.g., processor 304). In some embodiments, the second point cloud is accumulated from multiple scans of the environment by the radar sensor. In some embodiments, at least one data processing system associated with radar sensor 202*c* generates 3D data that represents the boundaries of a physical object, the surfaces (e.g., the topology of the surfaces) of the physical object, and/or the like. In some examples, the image is used to determine the boundaries of physical objects in the field of view of radar sensors 202*c*.

At 706, the first point cloud is transformed to a vehicle-centric reference frame using the at least one processor. For example, the lidar and/or a processor (e.g., processor 304) can transform the first point cloud of objects (e.g., objects 104*a*-104*n*) in the FOV of the lidar into a frame that is centered around the vehicle 200. In this example, being centered does not mean that the vehicle 200 is represented by a point in the exact center of the first point cloud, but rather that the points in the first point cloud have positions that are relative to the vehicle 200.

At 708, the second point cloud is transformed to the vehicle-centric reference frame using the at least one processor. For example, the radar sensor and/or a processor (e.g., processor 304) can transform the second point cloud of objects (e.g., objects 104*a*-104*n*) in the FOV of the radar into a frame that is centered around the vehicle 200. In this example as well, being centered does not mean that the vehicle 200 is represented by a point in the exact center of the second point cloud, but rather that the points in the second point cloud have positions that are relative to the vehicle 200.

At 710, a first set of clusters of points is generated in the first point cloud using the at least one processor. For example, the at least one processor can form a group of clustered points for a first point cloud of objects (e.g., specific objects from the set of objects 104*a*-104*n*). In an embodiment, the first set of points in the first point cloud is accumulated from multiple scans of the environment by the lidar sensor, for example. In some embodiments, generation of the first set of clusters of points uses geometric-based lidar object detection (e.g., GRAPHSEG).

At 712, a second set of clusters of points is generated in the second point cloud using the at least one processor. For example, the at least one processor can form a group of clustered points for a second point cloud of objects (e.g., specific objects from the set of objects 104*a*-104*n*). In an embodiment, the second set of points in the second point cloud is accumulated from multiple scans of the environment by the radar sensor, for example. In some embodiments, generation of the second set of clusters uses a clustering algorithm (e.g., Density-Based Spatial Clustering of Applications with Noise (DBSCAN)).

At 714, a third set of clusters is generated based on an association of the first set of the clusters and the second set of the clusters using the at least one processor. For example, the third set of clusters is generated based on an association of the first set of clusters from radar and the second set of clusters from lidar (from steps 710 and 712, for example). Then features for the third set of clusters obtained from each of a LiDAR branch and a RADAR branch in a network are combined at a feature level to create fused LiDAR/RADAR-generated features.

At 716, at least one label is generated for at least one object in at least one cluster in the third set of clusters based on a machine learning model (e.g., a deep learning network 600) with the at least one processor. As an example, the label that is generated can indicate the type of object that is represented by the third set of clusters.

In some embodiments, process 700 further includes the generation of anchor boxes. In some embodiments, a first set of anchor boxes is generated for the first set of clusters. A second set of anchor boxes is generated for the second set of clusters. A third set of anchor boxes is generated based on an association of the points in the first set of anchor boxes and the second set of anchor boxes. At least one label is generated for at least one anchor box in the third set of anchor boxes based on the machine learning model (e.g., a deep learning network 600). The labeling can include classifying the at least one physical object based on one or more groupings of physical objects (e.g., bicycles, vehicles, traffic signs, pedestrians, and/or the like).

In some embodiments, process 700 further includes the use of object detection from fusion. For example, using a control circuit of the vehicle, the vehicle is operated to traverse a trajectory that is based on the at least one object in the at least one anchor box of the third set of clusters of points. For example, the trajectory is a path as a function of time that is to be taken by the vehicle 200 to safely navigate past an object (e.g., a parked car or a pedestrian).

In some embodiments, process 700 further includes the use of multiple sensor scans. For example, the first point cloud and the second point cloud can be accumulated from multiple scans of the environment by the lidar sensor and the radar sensor, respectively. A result of the multiple scans is to produce point clouds that are more accurate, for example, than a single scan. For example, the multiple scans can account for movement of an object, such as a moving pedestrian or another vehicle in traffic. At the timestamp of a current lidar sweep, the latest radar sweep, and past M lidar sweeps and N radar sweeps (normally M, N between 2-10 sweeps) are transformed to the current timestamp by compensating the vehicle's motion using the poses. All past lidar and radar points are converted to current lidar sweep coordinates. The lidar clusters are segmented from the merged lidar point cloud from all lidar sweeps, and radar clusters are segmented from the merged radar point cloud from all radar sweeps.

In some embodiments, associating cluster points, such as the third cluster, is based on rules. In some examples, the first set of clusters and the second set of clusters are associated based on at least one rule that designated a level of clustering based, for example, on a distance between centroids of the clusters, a comparison of headings and velocities of the clusters, and so on. The cluster velocity and heading angle can be calculated from the cluster. As described previously, each cluster contains points from multiple sweeps. The heading and velocity can be calculated from the centroid displacement and the time difference between the points from different timestamps within the cluster. Given the centroid, heading and velocity for each cluster, the center distance, heading angle and velocity difference can be calculated between two clusters to determine their similarity. Weighted scores of these entities can be used as the cost/similarity for the data association.

In some embodiments, process 700 further includes the use of lidar cluster algorithms. For example, generating a first set of clusters of points in the first point cloud can include applying graph cut based segmentation to the first point cloud (e.g., using GRAPHSEG or GRAPHCUT algorithms).

In some embodiments, process 700 further includes the use of lidar cluster sizes to determine bounding boxes (b-boxes) for radar points. For example, a size of the first cluster of points can be used to determine an anchor box size for the second cluster of points. In some embodiments, process 700 further includes the use of b-boxes for radar points to determine lidar cluster size. Once a lidar cluster and a radar cluster are associated, a lidar cluster radius can be extended (for example, by 1.2 times). The radar points within this region can be added on top of the associated lidar cluster points, and vice versa. In this way, some missing points from the original lidar cluster and radar cluster can be recovered. The cluster size does not aim to determine the longest dimension of the bounding box, but rather the bounding box dimension (center, width, length, and angle) can be predicted by the lidar radar fusion net in FIG. 6.

In some embodiments, process 700 further includes techniques for handling the case when no associations between clusters are found. For example, if it is determined that there is no associated point in some of the first and second clusters, then at least one point with default values can be added to the first or second set of clusters.

In some embodiments, point decorations (or annotations) can occur. For example each point in the first cluster can be associated with position coordinates (in a point cloud reference frame) intensity value, and relative time information between multi-sweeps. Each point in the second cluster can be associated with a range, bearing, range rate, amplitude, and relative time information between multi-sweeps.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:

accessing, with at least one processor, a first point cloud representing light detection and ranging (LiDAR) sensor data regarding environment of a vehicle;

accessing, with the at least one processor, a second point cloud representing radar detection and ranging (RADAR) sensor data regarding the environment of the vehicle;

generating, with the at least one processor, a first set of clusters of points in the first point cloud and a first set of anchor boxes;

generating, with the at least one processor, a second set of clusters of points in the second point cloud and a second set of anchor boxes, wherein a size of the second set of anchor boxes is determined based on a size of the first set of clusters of points;

generating, with the at least one processor, a third set of clusters and a third anchor box based on an association of the first set of the clusters and the second set of the clusters in the first set of anchor boxes and the second set of anchor boxes, wherein generating the third set of clusters includes creating fused LiDAR/RADAR-generated features using features obtained from each of a LiDAR branch and a RADAR branch in a network;

generating, with the at least one processor and using the fused LiDAR/RADAR-generated features, at least one of an object label, a bounding box, or a velocity for each cluster in the third set of clusters based on a machine learning model; and causing, with the at least one processor, the vehicle to traverse the environment based on the environment based on at least one of the object label, the bounding box, or the velocity for each cluster in the third set of clusters.

2. The method of claim 1, further comprising:

generating at least one of an object label, a bounding box, and a velocity for the third anchor box based on the machine learning model.

3. The method of claim 1, wherein the first point cloud is accumulated from multiple scans of the environment by the LiDAR sensor, and wherein the second point cloud is accumulated from multiple scans of the environment by the RADAR sensor.

4. The method of claim 1, wherein the first set of clusters and the second set of clusters are associated based on heuristics features, wherein the heuristics features comprise at least one of:

a distance between centroids of the clusters, headings of the clusters, or velocities of the clusters.

5. The method of claim 1, further comprising:

generating a fusion deep learning network configured to combine complementary LiDAR points and RADAR points to determine one or more cross-modality features for object detection.

6. The method of claim 1, further comprising:

applying graph cut based segmentation to the first point cloud.

7. The method of claim 1, further comprising:

determining that there is no associated cluster between some of the first or second set of the clusters; and adding an associated dummy cluster with at least one point with default values.

8. The method of claim 1, wherein each point in the first set of clusters is associated with position coordinates in a point cloud reference frame and an intensity value, and relative time information between multiple sweeps of the LIDAR sensor, and wherein each point in the second set of clusters is associated with a range, a bearing, a range rate, an amplitude, and relative time information between multiple sweeps of the RADAR sensor.

9. The method of claim 1, wherein a size of the first set of anchor boxes is determined based on a size of the second set of clusters of points.

10. A system comprising:

at least one processor; and memory storing instructions that when executed by the at least one processor, cause the at least one processor to perform operations comprising:

accessing a first point cloud representing light detection and ranging (LiDAR) sensor data regarding environment of a vehicle;

accessing a second point cloud representing radar detection and ranging (RADAR) sensor data regarding the environment of the vehicle;

generating a first set of clusters of points in the first point cloud and a first set of anchor boxes;

generating a second set of clusters of points in the second point cloud and a second set of anchor boxes, wherein a size of the second set of anchor boxes is determined based on a size of the first set of clusters of points;

generating a third set of clusters and a third anchor box based on an association of the first set of the clusters and the second set of the clusters in the first set of anchor boxes and the second set of anchor boxes, wherein generating the third set of clusters includes creating fused LiDAR/RADAR-generated features using features obtained from each of a LiDAR branch and a RADAR branch in a network;

generating, using the fused LiDAR/RADAR-generated features, at least one of an object label, a bounding box, or a velocity for each cluster in the third set of clusters based on a machine learning model; and causing the vehicle to traverse the environment based on the environment based on at least one of the object label, the bounding box, or the velocity for each cluster in the third set of clusters.

11. The system of claim 10, the operations further comprising:

generating at least one of an object label, a bounding box, and a velocity for the third anchor box based on the machine learning model.

12. The system of claim 10, wherein the first point cloud is accumulated from multiple scans of the environment by the LiDAR sensor, and wherein the second point cloud is accumulated from multiple scans of the environment by the RADAR sensor.

13. The system of claim 10, wherein the first set of clusters and the second set of clusters are associated based on heuristics features, wherein the heuristics features comprise at least one of:

a distance between centroids of the clusters, headings of the clusters, or velocities of the clusters.

14. The system of claim 10, the operations further comprising:

generating a fusion deep learning network configured to combine complementary LiDAR points and RADAR points to determine one or more cross-modality features for object detection.

15. The system of claim 10, the operations further comprising:

applying graph cut based segmentation to the first point cloud.

16. The system of claim 10, the operations further comprising:

determining an anchor box size for the second set of clusters based on a size of the first set of clusters.

17. The system of claim 10, further comprising:

determining that there is no associated cluster between some of the first or second set of the clusters; and adding an associated dummy cluster with at least one point with default values.

18. The system of claim 10, wherein each point in the first set of clusters is associated with position coordinates in a point cloud reference frame and an intensity value, and relative time information between multiple sweeps of the LIDAR sensor, and wherein each point in the second set of clusters is associated with a range, a bearing, a range rate, an amplitude, and relative time information between multiple sweeps of the RADAR sensor.

19. A non-transitory, computer-readable storage medium having stored thereon instructions that when executed by one or more processors, cause the one or more processors to perform operations comprising:

accessing a first point cloud representing light detection and ranging (LiDAR) sensor data regarding environment of a vehicle;

accessing a second point cloud representing radar detection and ranging (RADAR) sensor data regarding the environment of the vehicle;

generating a first set of clusters of points in the first point cloud and a first set of anchor boxes;

generating a second set of clusters of points in the second point cloud and a second set of anchor boxes, wherein a size of the second set of anchor boxes is determined based on a size of the first set of clusters of points;

generating a third set of clusters and a third anchor box based on an association of the first set of the clusters and the second set of the clusters in the first set of anchor boxes and the second set of anchor boxes, wherein generating the third set of clusters includes creating fused LiDAR/RADAR-generated features using features obtained from each of a LiDAR branch and a RADAR branch in a network;

generating, using the fused LiDAR/RADAR-generated features, at least one of an object label, a bounding box, or a velocity for each cluster in the third set of clusters based on a machine learning model; and causing the vehicle to traverse the environment based on the environment based on at least one of the object label, the bounding box, or the velocity for each cluster in the third set of clusters.

* * * * *